(12) United States Patent
Swarts et al.

(10) Patent No.: US 9,369,978 B2
(45) Date of Patent: *Jun. 14, 2016

(54) METHOD AND SYSTEM FOR IMPLEMENTING MULTIPLE TIMING DOMAINS FOR PRIMARY AND SECONDARY SYNCHRONIZATION DETECTION IN EUTRA/LTE

(71) Applicant: Broadcom Corporation, Irvine, CA (US)

(72) Inventors: Francis Swarts, San Diego, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/076,573

(22) Filed: Nov. 11, 2013

(65) Prior Publication Data

US 2014/0071963 A1  Mar. 13, 2014

Related U.S. Application Data

(63) Continuation of application No. 12/500,575, filed on Jul. 9, 2009, now Pat. No. 8,614,994.

(51) Int. Cl.
*H04W 56/00* (2009.01)
*H04J 11/00* (2006.01)
*H04L 27/26* (2006.01)

(52) U.S. Cl.
CPC ......... *H04W 56/001* (2013.01); *H04J 11/0069* (2013.01); *H04L 27/2655* (2013.01); *H04L 27/2671* (2013.01); *H04L 27/2675* (2013.01); *H04L 27/2662* (2013.01)

(58) Field of Classification Search
CPC ..... H04J 3/00; H04J 11/0069; H04W 56/001; H04L 27/2655; H04L 27/2675; H04L 27/2671; H04L 27/2662
USPC .................................. 370/201, 336; 375/356
See application file for complete search history.

(56) References Cited

U.S. PATENT DOCUMENTS

| | | | | |
|---|---|---|---|---|
| 4,302,631 A | * | 11/1981 | Shenoi et al. | 379/339 |
| 5,727,034 A | * | 3/1998 | Ojaniemi | 375/356 |
| 6,502,069 B1 | * | 12/2002 | Grill et al. | 704/219 |
| 7,599,451 B2 | | 10/2009 | May | |
| 7,903,772 B2 | * | 3/2011 | Jensen | 375/350 |

(Continued)

*Primary Examiner* — Mark Rinehart
*Assistant Examiner* — Gbemileke Onamuti
(74) *Attorney, Agent, or Firm* — Sterne, Kessler, Goldstein & Fox P.L.L.C.

(57) ABSTRACT

A mobile device receives a signal, from a base station, comprising a primary synchronization sequence (PSS) and a secondary synchronization sequence (SSS). The mobile device utilizes two different sampling rates to perform the PSS synchronization and the SSS detection individually. For example, the mobile device synchronizes to the received PSS at a first sampling rate such as 0.96 MHz, which is determined based on the PSS transmission rate and/or the length of the received PSS. The mobile device detects the received SSS at a second sampling rate such as 1.92 MHz, which equals to the sampling rate for an analog-to-digital conversion at the mobile device. The received PSS and associated symbol timing are detected through the PSS synchronization to support the SSS detection. The detected SSS is used to acquire cell-specific parameters such as cell ID. The acquired cell-specific parameters ensure proper communications between the mobile device and the base station.

19 Claims, 5 Drawing Sheets

(56) References Cited

U.S. PATENT DOCUMENTS

| | | |
|---|---|---|
| 2002/0093908 A1 | 7/2002 | Yeap |
| 2006/0165200 A1 | 7/2006 | Wagner et al. |
| 2007/0153689 A1* | 7/2007 | Strub ................. H04L 63/1441 370/230 |
| 2008/0274753 A1 | 11/2008 | Attar et al. |
| 2009/0046671 A1* | 2/2009 | Luo ............................... 370/336 |
| 2009/0323642 A1* | 12/2009 | Tanno et al. ................. 370/336 |
| 2011/0007717 A1 | 1/2011 | Swarts et al. |

* cited by examiner

METHOD AND SYSTEM FOR IMPLEMENTING MULTIPLE TIMING DOMAINS FOR PRIMARY AND SECONDARY SYNCHRONIZATION DETECTION IN EUTRA/LTE

CROSS-REFERENCE TO RELATED APPLICATIONS/INCORPORATION BY REFERENCE

This application is a continuation of U.S. patent application Ser. No. 12/500,575, filed on Jul. 9, 2009, now U.S. Pat. No. 8,614,994, which is hereby incorporated by reference in its entirety.

FIELD OF THE INVENTION

Certain embodiments of the invention relate to communication systems. More specifically, certain embodiments of the invention relate to a method and system for implementing multiple timing domains for primary and secondary synchronization detection in EUTRA/LTE.

BACKGROUND OF THE INVENTION

Various communication standards such as Evolved Universal Terrestrial Radio Access (E-UTRA), also called Long Term Evolution (LTE), have been developed to offer comparatively high data rates to support high quality services. LTE/E-UTRA is a Third Generation Partnership Project (3GPP) standard that provides for an uplink speed of up to 50 megabits per second (Mbps) and a downlink speed of up to 100 Mbps. The LTE/E-UTRA standard represents a major advance in cellular technology. The LTE/E-UTRA standard is designed to meet current and future carrier needs for high-speed data and media transport as well as high-capacity voice support. The LTE/E-UTRA standard brings many technical benefits to cellular networks, some of which include the benefits provided by Orthogonal Frequency Division Multiplexing (OFDM) and/or Multiple Input Multiple Output (MIMO) data communication. In addition, Orthogonal Frequency Division Multiple Access (OFDMA) and Single Carrier—Frequency Division Multiple Access (SC-FDMA) are used on the downlink (DL) and on the uplink (UL), respectively.

Mobility management represents an important aspect of the LTE/E-UTRA standard. As a mobile device, also called user equipment (UE) in the LTE/E-UTRA standard, moves within an LTE/E-UTRA coverage area, the use of synchronization signal transmissions and cell search procedures provide a basis for the mobile device or UE to detect and synchronize with individual cells. To communicate with a particular cell, mobile devices in associated LTE/E-UTRA coverage area need to determine one or more cell specific transmission parameters such as, for example, symbol timing, radio frame timing, and/or a cell 10. In the LTE/E-UTRA standard, the cell-specific information is carried by reference and/or synchronization signals. The latter forms the basis for downlink (DL) synchronization and cell specific information identification at the mobile devices within the associated LTE/E-UTRA coverage area. Two downlink (DL) synchronization signals, namely Primary Synchronization Signal (PSS) and Secondary Synchronization Signal (SSS), are used to allow the mobile devices to synchronize to transmission timing of the particular cell, and thereby obtain cell specific information such as antenna configuration indicator, full physical Cell 10, and/or a Cell ID group indicator.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for implementing multiple timing domains for primary and secondary synchronization detection in LTE/E-UTRA, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for implementing multiple timing domains for primary and secondary synchronization detection in LTE/E-UTRA. In various embodiments of the invention, a mobile device is operable to receive signals from a base station over a LTE/E-UTRA air interface. The received signals may comprise a primary synchronization sequence or signal (PSS) and a secondary synchronization sequence or signal (SSS). The received PSS and SSS may be used by the mobile device to acquire cell-specific parameters such as transmission timing and/or cell ID associated with transmissions of the base station. The mobile device may be operable to synchronize to the received PSS at a first sampling rate of, for example, about 0.96 MHz and detect the received SSS at a second sampling rate of, for example, about 1.92 MHz. The mobile device may be operable to utilize the two different sampling rates to perform the PSS synchronization and the SSS detection individually. The first sampling rate used for the PSS synchronization is less than the sampling rate used for the SSS detection. The second sampling rate used for the SSS detection equals to the sampling rate at an associated analog-to-digital convertor (ADC). A corresponding digital baseband signal may be processed at the first sampling rate, for example, 0.96 MHz for the PSS synchronization. The first sampling rate may be determined based on, for example, the PSS transmission rate and/or the length of the received PSS. The mobile device is operable to decimate the corresponding digital baseband signal at the determined first sampling rate. The decimated digital baseband signal may be used to detect the received PSS and associated symbol timing. The detected PSS and associated symbol timing may be utilized to support the SSS detection. The SSS detection may be performed at the second sampling rate. The detected SSS may enable the mobile device to acquire cell-specific parameters such as, for example, cell ID and/or antenna configuration. The mobile device may be operable to communicate with the base station using the acquired cell specific parameters.

Figure 1:
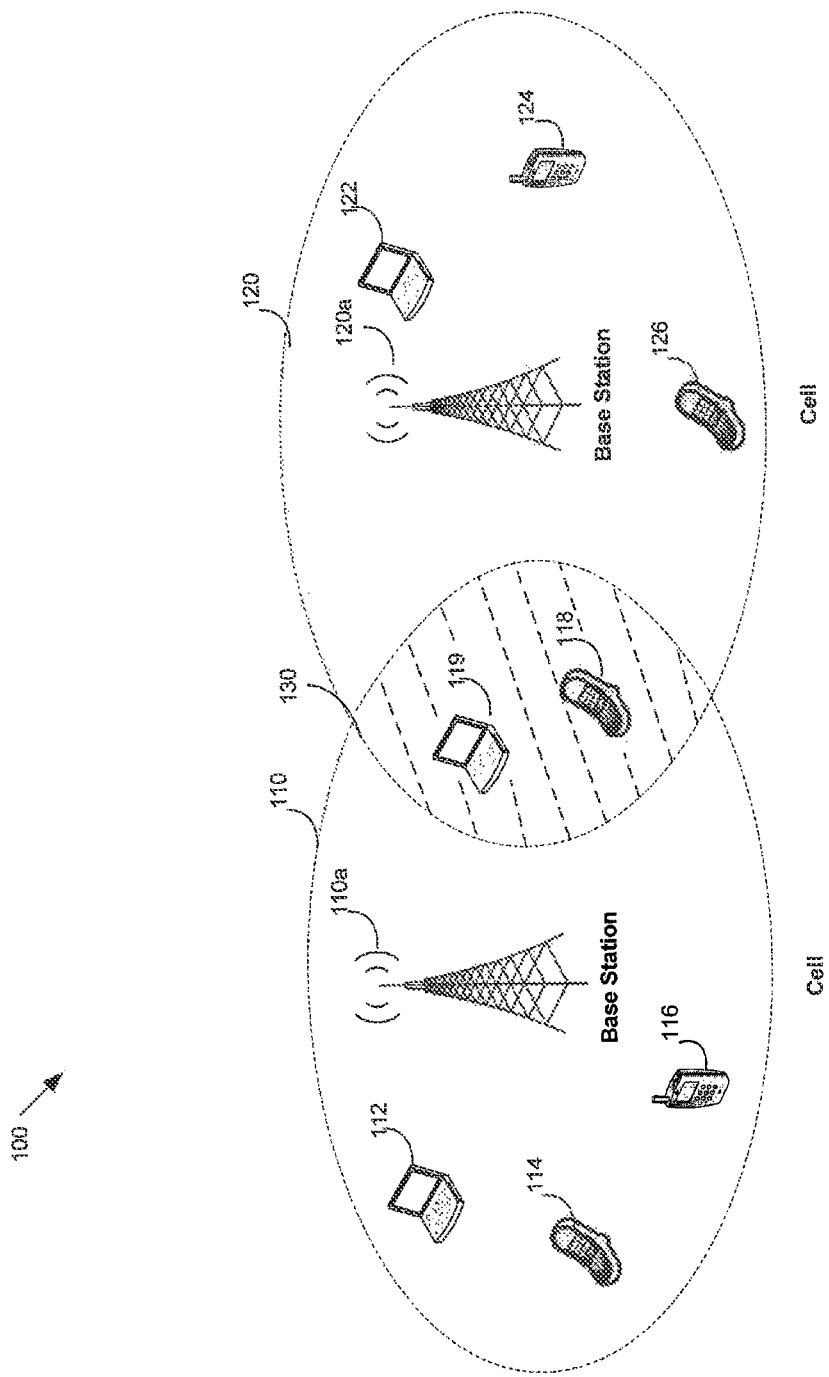
FIG. 1 is a diagram illustrating an exemplary LTE/E-UTRA communication system that is operable to implement multiple timing domains for primary and secondary synchronization detection, in accordance with an embodiment of the invention.

FIG. 1 is a diagram illustrating an exemplary LTE/E-UTRA communication system that is operable to implement multiple timing domains for primary and secondary synchronization detection in LTE/E-UTRA. Referring to FIG. 1, there is shown a LTE/E-UTRA communication system 100. The LTE/E-UTRA communication system 100 comprises a plurality of cells, of which cells 110-120 are displayed. A LTE/E-UTRA coverage area 130 is the overlapped coverage area of the cell 110 and the cell 120. The cell 110 and the cell 120 are associated with a base station 110a and a base station 120a, respectively. The LTE/E-UTRA communication system 100 comprises a plurality of mobile devices, of which mobile devices 110-126 are illustrated. The mobile devices 112-116 are located in the cell 110. The mobile devices 122-126 are shown located in the cell 120. The mobile device 118 and the mobile device 119 are shown located in the overlapped LTE/E-UTRA coverage area 130.

A base station such as the base station 110a may comprise suitable logic, circuitry, interfaces and/or code that are operable to manage various aspects of communication, for example, communication connection establishment, connection, maintenance and/or connection termination, with associated mobile devices within the cell 110. The base station 110a may be operable to manage associated radio resources such as, for example, radio bearer control, radio admission control, connection mobility control, and/or dynamic allocation of radio resources within the cell 110 in both uplink and downlink communication. The base station 110a may be operable to utilize physical channels and physical signals for communications in both the uplink and the downlink communication. The physical channels may carry information from higher layers to communicate user data as well as user control information. The physical signals such as synchronization signals may not carry information from higher layers. In the LTE/E-UTRA standard, the base station 110a may be operable to transmit a primary synchronization signal (PSS) and a secondary synchronization signal (SSS). The base station 110a may be operable to transmit the PSS and the SSS on a per 5 ms basis, in the last two OFDM symbols of the first and eleventh slot in each radio frame. The PSS is chosen from a variety of Zadhoff-Chu sequences, carrying the information of the identity of the base station or cell within a cell group. A Zadhoff-Chu sequence is a complex-valued mathematical sequence in time domain. The SSS is a sequence carrying the information about the cell group, encoded with a scrambling sequence. After successful time and frequency synchronization via the PSS, the frame boundary synchronization and/or the cell identification may be performed via SSS detection. The transmission of the PSS and the SSS may allow timing and frequency offset issues to be resolved before cell-specific information may be determined. This may reduce complexity in initial cell search and/or handover modes for associated mobile devices such as the mobile device 114 and the mobile device 118.

A mobile device such as the mobile device 118 may comprise suitable logic, circuitry, interfaces and/or code that may be operable to communicate with a base station such as the base station 110a for services supported, for example, in the LTE/E-UTRA standard. To communicate with the base station 110a, the mobile device 118 may be operable to determine one or more transmission parameters used by base station 110a. Such information may be obtained by, for example, decoding a Broadcast Channel (BCH) signal from the base station 110a. To that end, the mobile device 118 may need to synchronize to corresponding symbol timing and frame timing of transmissions from the base station 110a so as to acquire cell-specific parameters such as, for example, associated cell ID and/or antenna configuration. In this regard, the mobile device 118 may be operable to receive a plurality of PSSs and SSSs every 5 ms from neighbor or surrounding base stations such as the base station 110a and the base station 120a. The received plurality of PSSs are base station or cell specific. The mobile device 118 may be operable to detect or select a particular PSS from the received plurality of PSSs to acquire PSS synchronization. The selected PSS may be used to estimate a channel. The resulting channel estimates may be utilized to decode or detect the corresponding associated SSS for frame boundary synchronization and cell group information identification. Various methods may be used by the mobile device 118 to detect or select the particular PSS out of the received plurality of PSSs. For example, the mobile device 118 may be operable to generate a plurality of correlation reference sequences (reference PSSs) to correlate or match with each of the received plurality of PSSs, respectively. Resulting correlation peaks may indicate possible PSS timing hypotheses under consideration. The mobile device 118 may be operable to compare the resulting correlation peaks to select the particular PSS corresponding to the maximum correlation peak magnitude. The position of the maximum peak magnitude may indicate the ending position of the particular PSS and provide the symbol timing of the corresponding cell such as the cell 110. The symbol timing may be utilized to detect the received SSSs for cell specific information such as, for example, frame boundary and/or Cell ID group indicator.

In the LTE/E-UTRA standard, the mobile device 118 may be required to perform the SSS detection at a specific sampling rate, which equals to a corresponding analog-to-digital frequency of 1.92 MHz, for an accurate SSS detection. However, when performing the PSS synchronization, an acceptable performance may be achieved at a sampling rate of, for example, 0.96 MHz, which is lower than the specific sampling rate of 1.92 MHz. The use of the specific sampling rate of 1.92 MHz may lead to an over-sampled processing for the PSS synchronization. In this regard, the mobile device 118 may be operable to process the received PSSs and SSSs individually in two different timing domains to minimize memory requirements in the PSS synchronization and at the same time to meet implementation requirements for the SSS detection based on the LTE/E-UTRA standard. For example, in order to meet the various requirements for the SSS detection in the LTE/E-UTRA standard, the mobile device 118 may be operable to process the received SSSs at the specific analog-to-digital sampling frequency of 1.92 MHz.

On the other hand, to optimize the PSS synchronization, the mobile device 118 may be operable to reduce the analog-to-digital sampling frequency by a decimation factor of, for example, 2, and perform the PSS synchronization at the reduced or decimated sampling rate. The decimation factor may be determined based on, for example, a PSS transmission rate and/or lengths of PSSs transmitted by, for example, the base station 110a. Using multiple timing domains to perform the PSS synchronization and the SSS detection may optimize the performance of the PSS synchronization while ensuring the implementation requirements for SSS detection to be met with respect to the LTE/E-UTRA standard.

In an exemplary operation, the base station 110a may be operable to perform communications within the cell 110 using physical channels and physical signals such as a PSS and a SSS. The base station 110a may be operable to transmit base station specific PSS and SSS, regularly, for example, every 5 ms. To communicate with the base station 110a, a mobile device such as the mobile device 118 may be operable to acquire the transmitted PSS and SSS so as to determine one or more transmission parameters used by base station 110a. For example, the mobile device 118 may be operable to acquire PSS synchronization to identify the symbol timing and channel estimation. The resulting channel estimates and the identified symbol timing may be used to detect the transmitted SSS for cell specific parameters such as frame boundary synchronization and/or cell group information.

For the LTE/E-UTRA standard, to ensure an accurate SSS detection, the mobile device 118 may need to perform the SSS detection at a sampling rate that is equal to a specific analog-to-digital sampling frequency of 1.92 MHz. However, for a given PSS transmission rate such as 0.2 KHz and the length of 63 for time-domain PSS sequences, an acceptable performance for acquiring PSS synchronization may be achieved at a lower sampling rate such as 0.96 MHz. In this regard, the mobile device 118 may be operable to use two different timing domains, for example, 1.92 MHz and 0.96 MHz, to perform the SSS detection and the PSS synchronization individually. The use of the two different timing domains for individually performing the SSS detection and the PSS synchronization may optimize the performance of the PSS synchronization while the implementation requirements are met for SSS detection with respect to the LTE/E-UTRA standard.

Figure 2:
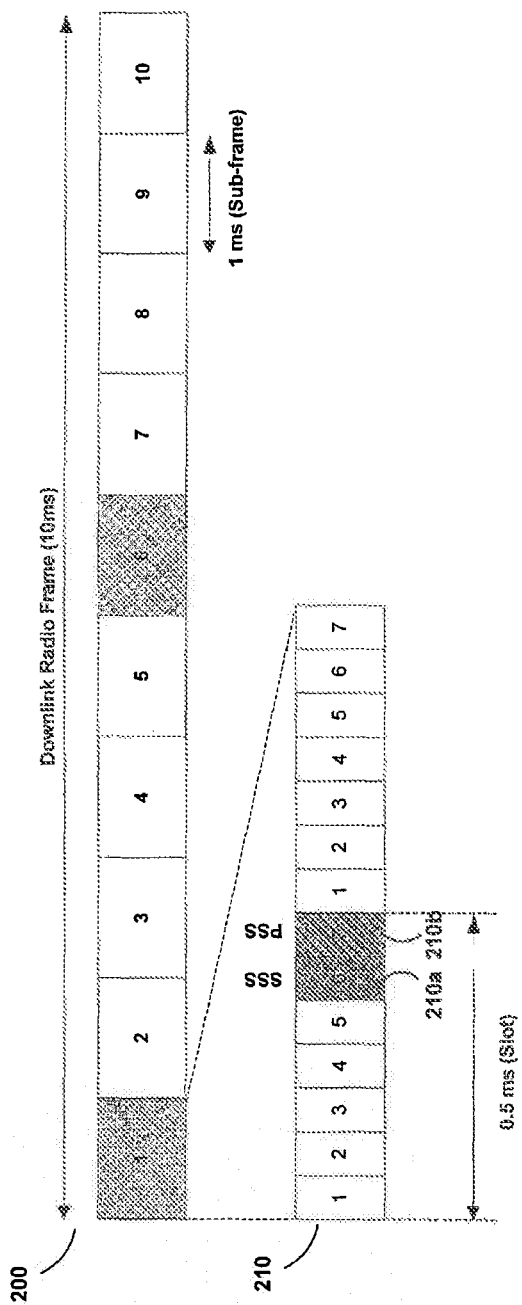
FIG. 2 is a block diagram of an exemplary LTE/E-UTRA downlink synchronization signal structure, in accordance with an embodiment of the invention.

FIG. 2 is a block diagram of an exemplary LTE/E-UTRA downlink Synchronization signal structure, in accordance with an embodiment of the invention. Referring to FIG. 2, there is shown a downlink radio frame 200. In the LTE/E-UTRA standard, the downlink radio frame 200 may be divided into twenty equally sized slots with two contiguous slots arranged into a sub-frame such as the sub-frame 210. Downlink synchronization signals such as a PSS 210a and a SSS 210b may be transmitted from a base station such as, for example, the base station 110a and/or the base station 110b, to associated mobile devices such as the mobile device 118 so that the mobile device 118 may obtain correct timing for the downlink radio frame 200 and acquire cell-specific parameters such as, for example, associated cell ID and/or antenna configuration.

The PSS 210a and the SSS 210b may be transmitted on sub-frame 0 and 5 of the downlink radio frame 200 and be contained in two consecutive OFDM symbols in a corresponding sub-frame. The PSS may be used to identify the symbol timing and the physical layer ID within a cell ID group. The SSS may be used for identifying frame boundary, detecting cell ID group, and/or acquiring system parameters such as cyclic prefix (CP) length. Signals in the downlink radio frame 200 may be correlated at the mobile device 118 with a plurality of correlation reference sequences (reference PSSs). The correlation process may be performed at a sampling rate of, for example, 0.96 MHz. The mobile device 118 may be operable to synchronize to the PSS based on the correlation so as to identify the symbol timing and channel estimation. The SSS detection may be performed using the resulting channel estimates and the identified symbol timing. To ensure an accurate SSS detection, the SSS detection may be performed at a sampling rate of 1.92 MHz as required with respect to the LTE/E-UTRA standard. Two different sampling rates, for example, 1.92 MHz and 0.96 MHz, may be used to perform PSS synchronization and SSS detection, individually.

Figure 3:
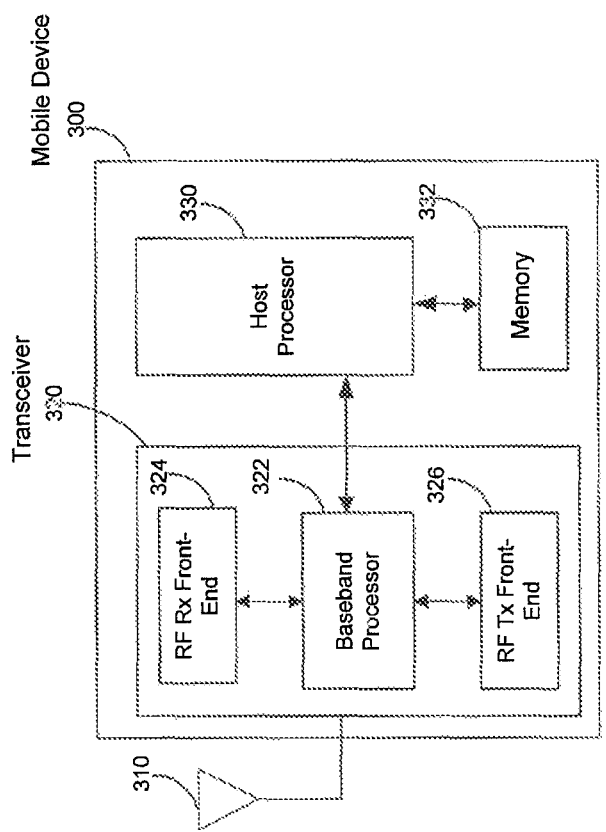
FIG. 3 is a block diagram of an exemplary mobile device that may be operable to implement multiple timing domains for primary and secondary synchronization detection, in accordance with an embodiment of the invention.

FIG. 3 is a block diagram of an exemplary mobile device that may be operable to implement multiple timing domains for primary and secondary synchronization detection, in accordance with an embodiment of the invention. Referring to FIG. 3, there is shown a mobile device 300 comprising an antenna 310, a transceiver 320, a host processor 330 and a memory 332. The transceiver 320 comprises a radio frequency (RF) receiver (Rx) front-end 324, a radio frequency (RF) transmitter (Tx) front-end 326 and a baseband processor 322.

The antenna 310 may comprise suitable logic, circuitry, interfaces and/or code that may be suitable for transmitting and/or receiving electromagnetic signals. Although a single antenna is illustrated, the invention is not so limited. In this regard, the transceiver 320 may be operable to utilize a common antenna for transmission and reception of radio frequency (RF) signals adhering to one or more wireless standards, may utilize different antennas for each supported wireless standard, and/or may utilize a plurality of antennas for each supported wireless standard. Various multi-antenna configurations may be utilized to take advantage of smart antenna technologies, diversity and/or beamforming, for example.

The transceiver 320 may comprise suitable logic, circuitry, interfaces and/or code that may be operable to transmit and/or receive RF signals adhering to one or more wireless standards such as the LTE/E-UTRA standard.

The RF Rx front-end 324 may comprise suitable logic, circuitry, interfaces and/or code that may be operable to process RF signals received, for example, over a LTE/E-UTRA air interface, via the antenna 310. The RF Rx front-end 324 may be operable to convert the received RF signals to corresponding baseband signals. The resulting baseband signals may be communicated with the baseband processor 322 for further baseband processing.

The RF Tx front-end 326 may comprise suitable logic, circuitry, interfaces and/or code that may be operable to process RF signals for transmission. The RF Tx front-end 326 may be operable to receive baseband signals from the baseband processor 128 and convert the baseband signals to corresponding RF signals for transmission via the antenna 310.

The baseband processor 322 may comprise suitable logic, circuitry, interfaces and/or code that may be operable to manage and/or control operations of the RF Rx front-end 324 and the RF Tx front-end 326, respectively. The baseband processor 322 may be operable to communicate baseband signals with the transceiver 320. The baseband processor 322 may be operable to handle baseband signals to be transferred to the RF Tx front-end 326 for transmission and/or process baseband signals from the RF Rx front-end 224. The received baseband signals may comprise synchronization signals such as a PSS and a SSS. The received PSS and SSS may be utilized to acquire transmission timing and other cell-specific parameters such as, for example, associated cell ID and/or antenna configuration used in an associated cell. In this regard, the baseband processor 322 may be operable to generate a plurality of correlation reference sequences (reference PSSs) for acquiring PSS synchronization.

The baseband processor 322 may be operable to determine a sampling rate specifically for acquiring PSS synchronization. The specific sampling rate may be determined based on, for example, a PSS transmission rate and/or the length of the received PSS. The received baseband signals may be decimated or down-sampled at the determined PSS specific sampling rate. The baseband processor 322 may be operable to correlate the decimated baseband signals with each of the plurality of generated correlation reference sequences (reference PSSs) for acquiring PSS synchronization. The baseband processor 322 may be operable to detect the received PSS based on the resulting correlation peaks. The received PSS may be indicated by the maximum correlation peak magnitude. The position of the maximum correlation peak magnitude may provide the symbol timing of the received baseband signals.

The baseband processor 322 may be operable to provide channel estimation using the detected PSS and the identified symbol timing. The resulting channel estimates and the identified symbol timing may be utilized to perform the SSS detection. To ensure an accurate SSS detection, the baseband processor 322 may be operable to perform the SSS detection at a different sampling rate such as 1.92 MHz as required in the LTE/E-UTRA standard. The baseband processor 322 may be operable to acquire, via a successful SSS detection, cell-specific parameters such as, for example, frame boundary, cell ID group and system parameters such as cyclic prefix (CP) length. The acquired cell-specific parameters may ensure that the mobile device 300 communicates properly with an associated base station such as the base station 110a.

The host processor 330 may comprise suitable logic, circuitry, interfaces and/or code that may be operable to manipulate and control operation of the transceiver 320. The host processor 130 may be operable to communicate data with the transceiver 320 to support applications such as, for example, audio streaming on the mobile device 300.

The memory 332 may comprise suitable logic, circuitry, and/or code that may enable storage of information such as executable instructions and data that may be utilized by the host processor 330 as well as the baseband processor 322. The executable instructions may comprise algorithms that may be applied to various baseband signal processes such as synchronization and/or channel estimation. The memory 332 may comprise RAM, ROM, low latency nonvolatile memory such as flash memory and/or other suitable electronic data storage.

In an exemplary operation, the RF Rx front-end 124 may be operable to process RF signals received via the antenna 310 over the LTE/E-UTRA air interface, for example. The received RF signals may comprise PSSs and SSSs transmitted by base stations such as the base station 110a and/or the base station 120a. The received RF signals may be converted to corresponding baseband signals and communicated with the baseband processor 322 for further baseband processing. To communicate with a particular base station such as the base station 110a, the baseband processor 322 may be operable to synchronize to cell specific transmission timing such as, for example, the symbol timing and frame boundary used by the base station 110a. In this regard, the baseband processor 322 may be operable to generate a plurality of correlation reference sequences (reference PSSs) for acquiring PSS synchronization. The baseband processor 322 may be operable to determine a specific sampling rate for acquiring PSS synchronization based on the PSS transmission rate and/or the length of the received PSS.

The received baseband signals may be decimated according to the determined specific sampling rate. The baseband processor 322 may be operable to perform a correlation process between the decimated baseband signals and each of the plurality of generated correlation reference sequences (reference PSSs). The received PSS may be detected according to the resulting correlation peak magnitudes. The position of the maximum correlation peak magnitude may be used to detect the received PSS and identify the corresponding symbol timing of the received baseband signals. The detected PSS may be used for channel estimation. The identified symbol timing may be utilized to determine the channel estimates and detect the received SSS at a different sampling rate, which may be equal to about 1.92 MHz as required in the LTE/E-UTRA standard. Accordingly, the baseband processor 322 may be operable to acquire cell-specific parameters such as, for example, frame boundary following a successful SSS detection to ensure proper communications with an associated base station.

Figure 4:
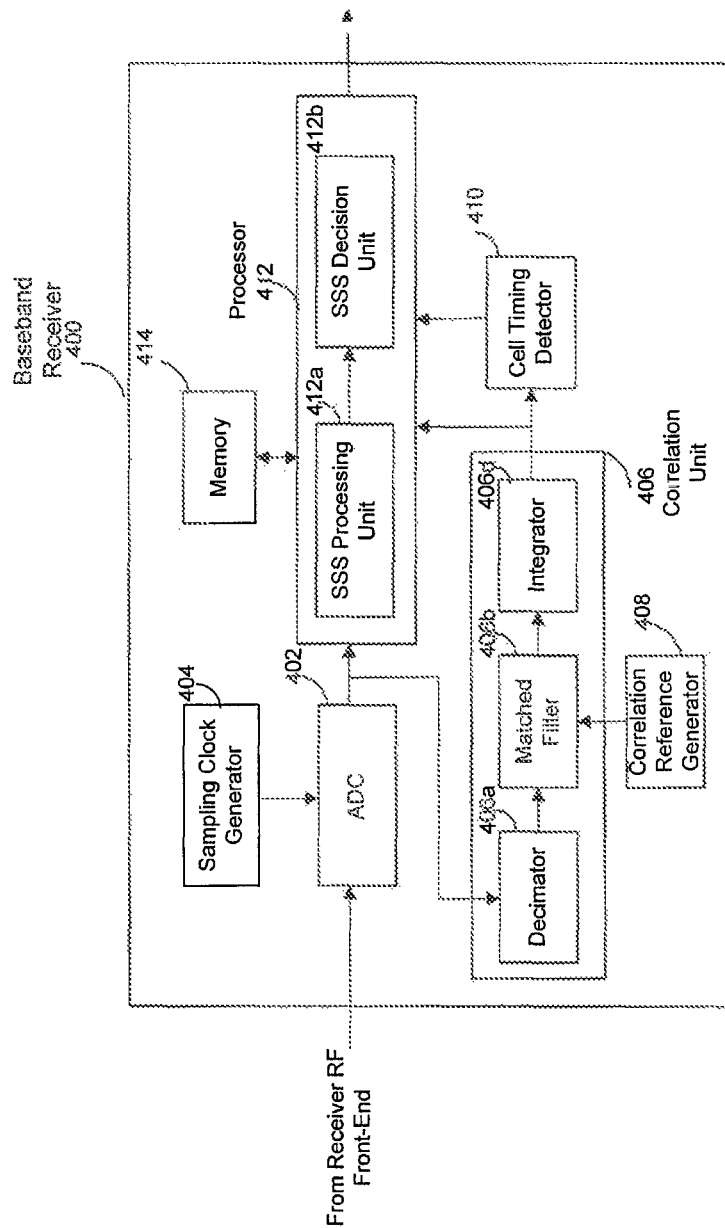
FIG. 4 is a block diagram illustrating an exemplary baseband receiver that is operable to implement multiple timing domains for primary and secondary synchronization detection, in accordance with an embodiment of the invention.

FIG. 4 is a block diagram illustrating an exemplary baseband receiver that is operable to implement multiple timing domains for primary and secondary synchronization detection, in accordance with an embodiment of the invention. Referring to FIG. 4, there is shown a baseband receiver 400. The baseband receiver 400 comprises an analog-to-digital converter (ADC) 402, a sampling clock generator 404, a correlation unit 406, a correlation reference generator 408, a cell timing detector 410, a processor 412 and a memory 414. The correlation unit 406 comprises a decimator 406a, a matched filter 406b, and an integrator 406c. The processor 412 comprises a SSS processing unit 412a and a SSS decision unit 412b.

The ADC 402 may comprise suitable logic, circuitry, interfaces and/or code that may be operable to convert analog baseband signals received from the RF Rx front-end 324 to corresponding digital baseband signals (e.g., bytes). The ADC 402 may be operable to sample the received analog baseband signals at an analog-to-digital sampling rate of, for example, 1.92 MHz, which is provided by the sampling cock generator 404. The resulting digital baseband signals may comprise values that are representative of the analog baseband signal amplitudes. The digital baseband signals may be communicated with the processor 412 for further baseband processing.

The sampling clock generator 404 may comprise suitable logic, circuitry, interfaces and/or code that may be operable to generate a sampling clock and provide to the ADC 402 for analog-to-digital conversion.

The correlation unit 406 may comprise suitable logic, circuitry, interfaces and/or code that may be operable to perform a correlation process to acquire PSS synchronization. The correlation process may be performed at a sampling rate, which is different from the analog-to-digital sampling rate at the ADC 402. The correlation unit 406 may be operable to minimize the memory requirements for acquiring PSS synchronization by using a reduced sampling rate. The correlation unit 406 may be operable to achieve the reduced sampling rate via the decimator 406a.

The decimator 406a may comprise suitable logic, circuitry, interfaces and/or code that may be operable to downsample the digital baseband signals from the ADC 402 by a decimation factor of M, where M $\in \{2, 3, \ldots\}$. The decimation factor of M may be determined based on the PSS transmission rate and/or the length of the received PSSs. The decimator 406a may be operable to keep every Mth sample and discard any remaining samples of the digital baseband signals. The down-sampled or decimated digital baseband signals may be communicated to the matched filter 406b for acquiring PSS synchronization.

The matched filter 406b may comprise suitable logic, circuitry, interfaces and/or code that may be operable to correlate the downsampled or decimated digital baseband signals received from the decimator 406a with each of a plurality of correlation reference sequences provided by the correlation reference generator 408. The matched filter 406b may be operable to perform the correlation process for the PSS synchronization at a reduced sampling rate at the decimator 406a.

The integrator 406c may comprise suitable logic, circuitry, interfaces and/or code that may be operable to accumulate correlation values, which are calculated at the matched filter 406b, over one slot duration. Resulting correlation peaks may indicate possible PSS timing hypotheses under consideration. In this regard, the number of possible PSS timing hypotheses may be minimized due to the usage of the reduced sampling rate at the matched filter 406b. Accordingly, the memory requirements for the integrator 406c may be reduced.

The correlation reference generator 408 may comprise suitable logic, circuitry, interfaces and/or code that may be operable to generate correlation reference sequences (reference PSSs) for the matched filter 406b of the correlation unit 406. The generated correlation reference sequences may be derived based on a variety of Zadoff-Chu sequences. The generated correlation reference sequences are complex-valued mathematical sequences in the time domain.

The cell timing detector 410 may comprise suitable logic, circuitry, interfaces and/or code that may be operable to determine transmission timing used in an associated cell according to peak correlation magnitude values at the output of the integrator 406c of the correlation unit 406. The cell timing detector 410 may be operable to detect a particular PSS, which is transmitted by an associated base station, by using a peak-searching algorithm, for example. The peak-searching algorithm may be operable to detect the particular PSS by comparing peak correlation magnitude values at the output of the integrator 406c of the correlation unit 406. The particular PSS may be detected according to the maximum peak correlation magnitude value. The position of the maximum peak magnitude may indicate the ending position of the detected particular PSS and provide transmission timing such as the (PSS) symbol timing used in the associated cell. The symbol timing may be determined over one slot duration. However, in instances where the signal-to-noise ratio (SNR) is low or when fading is severe, the accuracy of the symbol timing determined based on observations over a single slot may be unreliable. To increase reliability, the symbol timing may be determined using observations over a plurality of slots and the results may then be combined, for example, using non-coherent combining. This may ensure that the correct symbol timing may be identified for transmissions in the associated cell.

The PSS detection may not be limited to the described peak-searching algorithm, but may be using an arbitrary correlation sequence detection algorithm. The resulting symbol timing obtained may also be used to establish initial frequency offset between a receiver local oscillator and a transmitter local oscillator.

The processor 412 may comprise suitable logic, circuitry, interfaces and/or code that may be operable to process digital baseband signals from the ADC 402. The processor 412 may be operable to process the digital baseband signals at the specific sampling rate of, for example, 1.92 MHz as required in the LTE/E-UTRA standard. The processor 412 may be operable to perform various baseband procedures such as SSS detection using the detected particular PSS from the correlation unit 406 and the identified symbol timing from the cell timing detector 410. The digital baseband signals may be processed via the SSS processing unit 412a to detect the received SSS via the SSS decision unit 412b. The detected SSS may provide cell-specific parameters such as the cell ID and antenna configuration.

The SSS processing unit 412a may comprise suitable logic, circuitry, interfaces and/or code that may be operable to process the digital baseband signals received from the ADC 402 at the sampling rate of, for example, 1.92 MHz. The received digital baseband signals may be processed for coherent detection of the SSS according to the detected PSS from the correlation unit 406. For example, the SSS processing unit 412a may be operable to determine a mobile device specific scrambling code based on the detected PSS from the correlation unit 406. The SSS processing unit 412a may be operable to descramble the digital baseband signals using the determined scrambling code and communicate the descrambled digital baseband signals with the SSS decision unit 412b for SSS detection.

The SSS decision unit 412b may comprise suitable logic, circuitry, interfaces and/or code that may be operable to process the descrambled digital baseband signals from the SSS processing unit 412a for the SSS detection. The SSS decision unit 412b may be operable to determine the SSS position in the descrambled digital baseband signals based on the determined symbol timing from the cell timing unit 410. The determined SSS position may indicate, for example, frame boundary of transmissions in an associated cell. The SSS decision unit 412b may be operable to perform SSS decoding based on the determined SSS position for identifying cell-specific parameters such as, for example, cell ID group, reference signal sequences, and/or antenna configuration. The identified cell-specific parameters may ensure proper communications between the baseband receiver 400 with an associated base station such as, the base station 110a The memory 414 may comprise suitable logic, circuitry, and/or code that may enable storage of information such as executable instructions and data that may be utilized by the processor 412, the correlation unit 406, and/or the cell timing unit 410. The executable instructions may comprise algorithms that may be applied to various baseband procedures such as channel estimation, channel equalization, and/or channel coding. The executable instructions may comprise algorithms that may be applied to various correlation processes such as maximum ratio combining. The memory 414 may comprise RAM, ROM, low latency nonvolatile memory such as flash memory and/or other suitable electronic data storage.

In an exemplary operation, the baseband receiver 400 may be operable to receive analog baseband signals via the ADC 402. The received analog baseband signals may correspond to a RF signal transmitted by the base station 110a, for example. The received analog baseband signals may comprise a PSS and a SSS. The ADC 402 may be operable to convert the received analog baseband signals to corresponding digital baseband signals at a specific analog-to-digital sampling rate of, for example, 1.92 MHz. The specific analog-to-digital sampling rate may be provided by the sampling clock generator 404. The resulting digital baseband signals may be communicated with the correlation unit 406 for acquiring PSS synchronization. The correlation unit 406 may be operable to communicate with the correlation reference generator 408 for correlation reference sequences (reference PSSs). The correlation reference generator 408 may be operable to generate or derive the correlation reference sequences based on a variety of Zadoff-Chu sequences. The generated correlation reference sequences are complex-valued sequences in the time domain.

The correlation unit 406 may be operable to decimate the received digital baseband signals via the decimator 406a, for example, to reduce the sampling rate, from about 1.92 MHz to 0.96 MHz. The decimated digital baseband signals may be correlated via the matched filter 406b with each of the generated correlation reference sequences. Correlation values from the matched filter 406b may be accumulated over one slot duration via the integrator 406c. Resulting correlation peaks may provide possible PSS timing hypotheses under consideration. The correlation reference generator 408 may be operable to select or detect a particular PSS, which is transmitted by the base station 110a, according to the maximum peak correlation magnitude value at the output of the integrator 406c. The position of the maximum peak magnitude may indicate the ending position of the particular PSS and provide the symbol timing used by the base station 110a. The symbol timing information may be communicated to the processor 412. The processor 412 may be operable to process the digital baseband signals at a sampling rate equal to the specific analog-to-digital sampling rate used by the ADC 402. The processor 412 may be operable to process the digital baseband signals for the SSS detection according to the detected PSS and the corresponding symbol timing. For example, the processor 412 may be operable to perform SSS processing via the SSS processing unit 412a to detect the received SSS via the SSS decision unit 412b for cell-specific parameters such as the cell 10 and antenna configuration.

Figure 5:
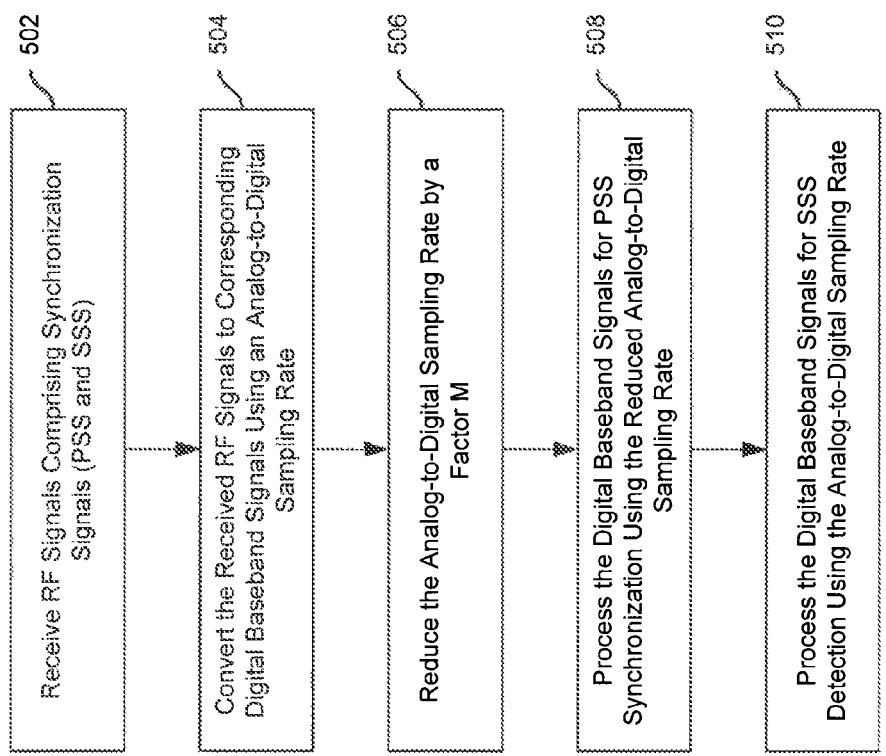
FIG. 5 is a flow chart illustrating an exemplary synchronization procedure that implements multiple timing domains for primary and secondary synchronization detection, in accordance with an embodiment of the invention.

FIG. 5 is a flow chart illustrating an exemplary synchronization procedure that implements multiple timing domains for primary and secondary synchronization detection, in accordance with an embodiment of the invention. Referring to FIG. 5, the exemplary steps may start with the step 502. In step 502, the RF RX front-end 324 may be operable to receive RF signals over, for example, the LTE/E-UTRA air interfaces. The received RF signals may comprise synchronization signals such as a PSS and a SSS. In step 504, the RF RX front-end 324 may be operable to convert the received RF signals to corresponding baseband signals and communicate with the baseband receiver 400. The resulting baseband signals may be converted to corresponding digital baseband signals via the ADC 402 at an analog-to-digital sampling rate of, for example, 1.92 MHz, as required in the LTE/E-UTRA standard.

In step 506, the baseband receiver 400 may be operable to reduce the sampling rate of the digital baseband signals by a decimation factor M via the decimator 406a. The decimation factor M may be determined based on, for example, PSS transmission rate and/or the length of the received PSSs. In step 508, the baseband receiver 400 may be operable to process the digital baseband signals for acquiring PSS synchronization via the correlation unit 406n and cell timing detector 410, respectively. The PSS synchronization may be performed at the reduced sampling rate so as to minimize the memory requirements for the PSS synchronization. In step 510, the baseband receiver 400 may be operable to perform SSS detection via the SSS processing unit 412a and the SSS decision unit 412b, respectively. The SSS detection may be performed at the analog-to-digital sampling rate to meet the implementation requirements with respect to the LTE/E-UTRA standard.

In various exemplary aspects of the method and system for implementing multiple timing domains for primary and secondary synchronization detection in LTE/E-UTRA, a mobile device such as the mobile device 114 may be operable to receive signals from the base station 110a. The received signals may comprise a primary synchronization sequence or signal (PSS) and a secondary synchronization sequence or signal (SSS). The received PSS and SSS may be used by the mobile device 114 to acquire cell-specific parameters such as transmission timing, cell ID, and/or antenna configuration associated with transmissions of the base station 110a. The mobile device 114 may be operable to synchronize to the received PSS at a first sampling rate of, for example, 0.96 MHz.

The mobile device 114 may be operable to detect the received SSS at a second sampling rate of, for example, 1.92 MHz. The mobile device 114 may be operable to utilize the two different sampling rates to perform the PSS synchronization and the SSS detection individually. The first sampling rate used for the PSS synchronization may be less than the second sampling rate used for the SSS detection. For example, for a PSS transmission rate of 0.2 KHz and the PSS sequence length of 63, an acceptable performance may be achieved for the PSS synchronization at a sampling rate of 0.96 MHz. However, in the LTE/E-UTRA standard, to ensure an accurate SSS detection, a sampling rate of 1.92 MHz, which equal to the analog-to-digital sampling rate used by the ADC 402, may be required for implementing the SSS detection. The ADC 402 may be operable to perform analog-to-digital conversion at the analog-to-digital sampling rate of, for example, 1.92 MHz. The resulting digital baseband signal may be processed at the first sampling rate, for example, 0.96 MHz, via the correlation unit 406. In this regard, the first sampling rate may be determined based on, for example, the PSS transmission rate and/or the length of the received PSS.

The correlation unit 406 may be operable to decimate the resulting digital baseband signal at the determined first sampling rate via the decimator 406a. The decimated digital baseband signal may be communicated to the matched filter 406b for a correlation process. Correlation values from the matched filter 406b may be accumulated over one slot duration. The resulting correlation peaks may be used to detect the received PSS and associated symbol timing via the cell timing detector 410. The detected PSS and associated symbol timing may be communicated with the processor 412 for the SSS detection, for example.

The processor 412 may be operable to process the digital baseband signals at a sampling rate of, for example, 1.92 MHz, which equals to the analog-to-digital sampling rate at the ADC 402. The processor 412 may be operable to perform the SSS detection via the SSS processing unit 412a and the SSS decision unit 412b based on the detected PSS. The mobile device 114 may be operable to acquire cell-specific parameters such as, for example, cell 10 and/or antenna configuration based on the detected SSS. The mobile device 114 may be operable to communicate with the associated base station such as the base station 110a using the acquired cell specific parameters, accordingly.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for a method and system for implementing multiple timing domains for primary and secondary synchronization detection in LTE/E-UTRA.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   receiving a primary synchronization signal (PSS) and a secondary synchronization signal (SSS);
   sampling the PSS at a first sampling rate;
   downsampling the sampled PSS by a decimation factor to reduce a sampling rate of the sampled PSS from the first sampling rate to a second sampling rate;
   correlating the downsampled PSS with each of a plurality of correlation reference sequences at the second sampling rate to provide a plurality of correlation values;
   accumulating the plurality of correlation values to determine a plurality of peak correlation magnitudes;
   determining a maximum peak correlation magnitude from among the plurality of peak correlation magnitudes;
   determining symbol timing based on a position of the maximum peak correlation magnitude; and
   performing SSS detection at the first sampling rate utilizing the symbol timing.

2. The method of claim 1, further comprising:
   determining the decimation factor based on a length of the PSS.

3. The method of claim 1, wherein the receiving comprises: receiving an analog signal comprising the PSS.

4. The method of claim 3, wherein the receiving further comprises:
   receiving a second analog signal comprising the SSS.

5. The method of claim 1, further comprising:
   acquiring cell specific parameters based on the SSS detection.

6. The method of claim 5, wherein the cell specific parameters comprise a transmission timing, a cell ID, or an antenna configuration.

7. The method of claim 1, wherein the first sampling rate is less than the second sampling rate.

8. The method of claim 1, wherein the first sampling rate is proportional to the second sampling rate.

9. The method of claim 1, further comprising:
   determining the decimation factor based on a transmission rate of the PSS.

10. A device, comprising:
    an analog-to-digital converter configured to receive a primary synchronization signal (PSS) and a secondary synchronization signal (SSS) and to sample the PSS at a first sampling rate;
    a decimator configured to downsample the sampled PSS by a decimation factor to reduce a sampling rate of the sampled PSS from the first sampling rate to a second sampling rate;
    a matched filter configured to correlate the downsampled PSS with each of a plurality of correlation reference sequences at the second sampling rate to provide a plurality of correlation values;
    an integrator configured to accumulate the plurality of correlation values to determine a plurality of peak correlation magnitude values;
    a cell timing detector configured to a determine a maximum peak correlation magnitude value from among the plurality of peak correlation magnitude values and to determine symbol timing based on a position of the maximum peak correlation magnitude value; and
    an SSS processing unit configured to perform SSS detection at the first sampling rate utilizing the symbol timing.

11. The device of claim 10, wherein the decimation factor is determined based on a length of the PSS.

12. The device of claim 10, further comprising:
    a baseband receiver configured to receive an analog signal comprising the PSS.

13. The device of claim 12, wherein the baseband receiver is further configured to receive a second analog signal comprising the SSS.

14. The device of claim 10, wherein the SSS processing unit is further configured to acquire cell specific parameters based on the SSS detection.

15. The device of claim 14, wherein the cell specific parameters comprise a transmission timing, a cell ID, or an antenna configuration.

16. The device of claim 10, wherein the first sampling rate is less than the second sampling rate.

17. The device of claim 10, wherein the first sampling rate is proportional to the second sampling rate.

18. The device of claim 10, further comprising:
    a correlation reference generator configured to provide the plurality of correlation reference sequences.

19. The device of claim 10, wherein the decimation factor is determined based on a transmission rate of the PSS.

* * * * *